Dec. 30, 1930.    E. W. SCHELLENTRAGER    1,787,287
AUTOMATIC RECORDING MEANS FOR DUMP CARS
Filed March 7, 1927    2 Sheets-Sheet 1

Inventor
Eugene W. Schellentrager
By Brockett + Hyde,
Attorneys

Dec. 30, 1930.  E. W. SCHELLENTRAGER  1,787,287
AUTOMATIC RECORDING MEANS FOR DUMP CARS
Filed March 7, 1927  2 Sheets-Sheet 2

INVENTOR
Eugene W. Schellentrager

BY
Brockett, Hyde, Higley & Meyer
ATTORNEYS

Patented Dec. 30, 1930

1,787,287

UNITED STATES PATENT OFFICE

EUGENE W. SCHELLENTRAGER, OF CLEVELAND HEIGHTS, OHIO, ASSIGNOR TO THE ATLAS BOLT & SCREW COMPANY, OF CLEVELAND, OHIO, A CORPORATION OF OHIO

AUTOMATIC RECORDING MEANS FOR DUMP CARS

Application filed March 7, 1927. Serial No. 173,556.

This invention relates to industrial dump scale cars, more particularly having reference to means for weighing and recording the loads therein, and specifically embraces a means for actuation of the recording means whereby an accurate record may be obtained.

My invention is most advantageously employed in connection with a well known automatic type of dump car arranged for electrical automatic operation upon ways such as tracks between loading and dumping positions, the loading of the car being accomplished from a bin, the mouth of which terminates immediately above the car hopper in the loading position; and movement of the car being in an automatically predetermined cycle, the bin gate is arranged for actuation by the car, the gate being opened as the car attains the extremity of its run to loading position and the gate being similarly closed as the car leaves the loading position.

In such an arrangement the flow through the bin mouth is primarily terminated by piling up of the contents of the car hopper to choke the same, the bin gate not being closed until movement of the car therefrom; and for this reason an accurate determination of the load weight in the car is impossible. My invention embraces means for delaying actuation of the weight recording apparatus until the car has cleared the loading position and the load therein is therefore free from external forces which would result in erroneous weight indications.

Figure 1:
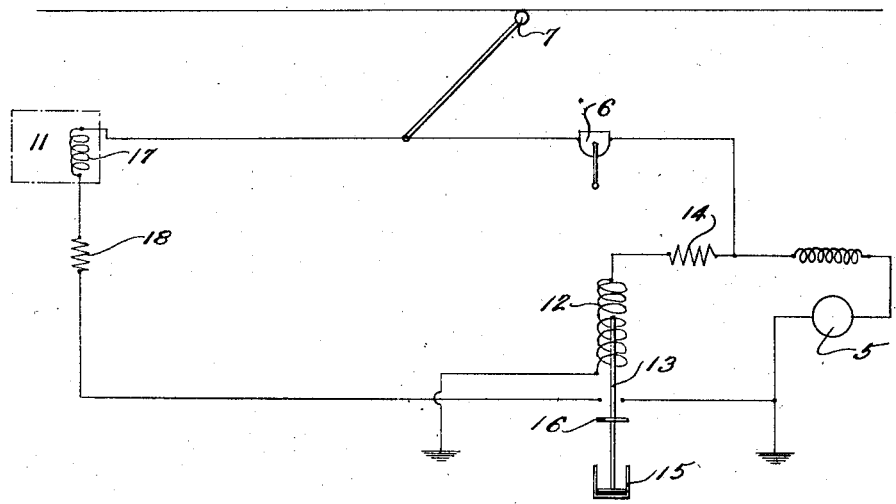
Figure 2:
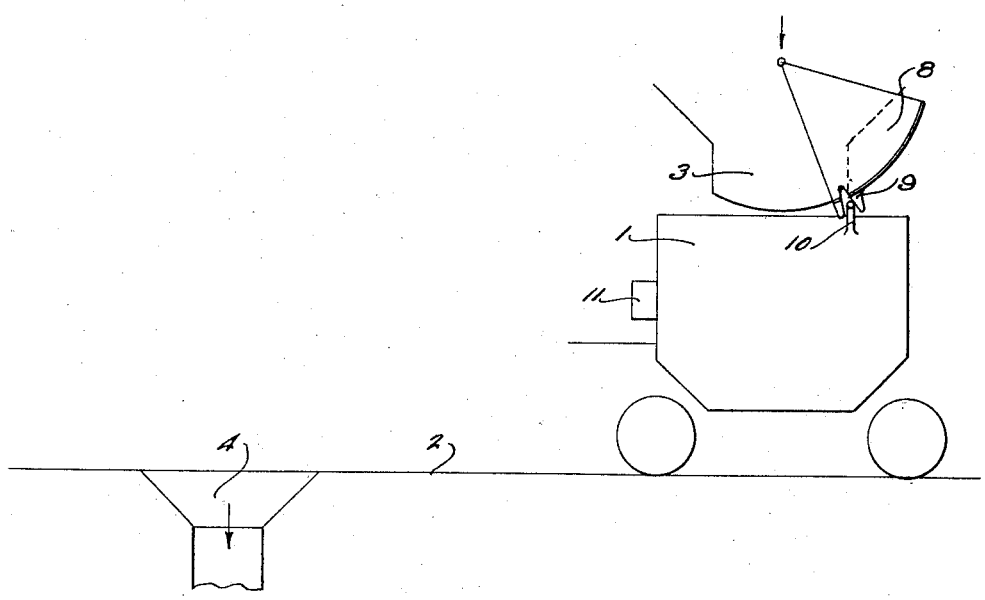
Figure 3:
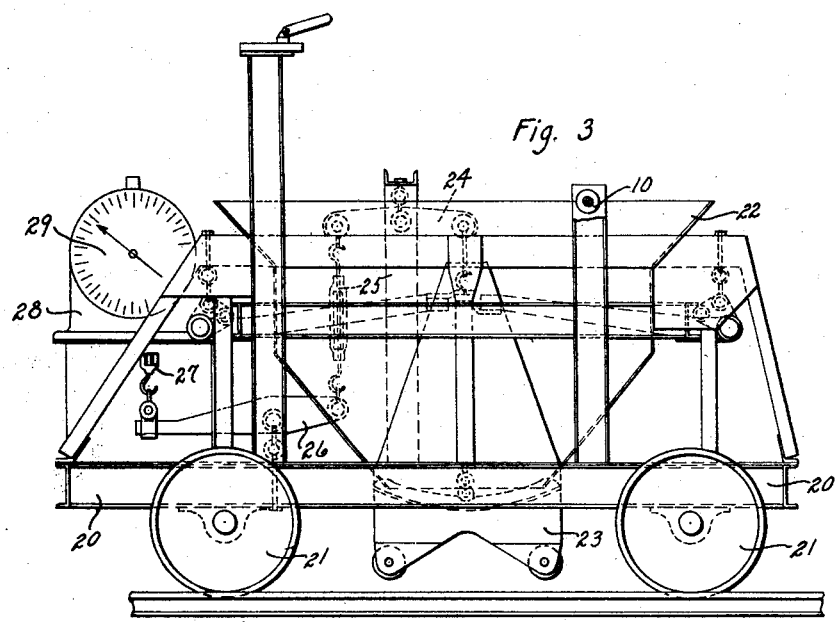
Figure 4:
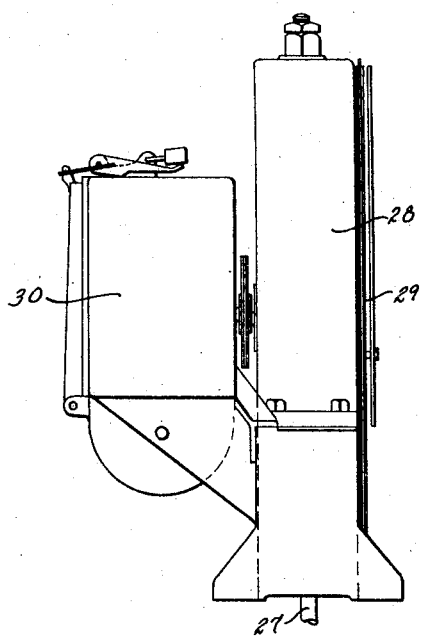

The exact nature of the invention together with advantages arising from the use thereof will be apparent from the following description taken in connection with the accompanying drawings in which Fig. 1 is a circuit diagram of an application of the invention; Fig. 2 is a side elevation of the principal parts of a system to which my invention as set forth in Fig. 1 may be applied; Fig. 3 is a detail side elevation of one form of car mechanism embodying the invention; and Fig. 4 is a side elevation of the weighing and recording instruments.

Referring now more particularly to the drawings, 1 represents the hopper of a dump scale car movable upon ways such as a track 2 between the loading position shown beneath the mouth 3 of a storage bin and the mouth 4 of a chute into which the contents of the car may be dumped. The car is provided with driving means such as a motor 5 and may be arranged for automatic operation between the loading and dumping positions as by means of an automatic switch 6, the necessary power connections being accomplished through a trolley 7 and the grounded track as indicated, all in the usual manner. A gate 8 is adapted to close the mouth 3 of the loading bin and is provided with a pair of depending members 9 adapted to be engaged by a projecting member 10 on the car to open or close the mouth 3 as the car attains or departs from the loading position shown, this arrangement also being well known in the art.

The car is provided with suitable weighing and weight-recording mechanism, the weighing and recording instruments of which are conventionally illustrated at 11 Fig. 2, and which instruments are adapted for electrical actuation to produce a record of the load in the car hopper, the electrical circuits therefor being shown in Fig. 1. The weighing and recording instruments may be of any suitable description, such as those shown in the Patent No. 1,329,567 granted February 3, 1920 to Samson D. Wright, to which referenece may be had for a more complete description if desired. The mechanical connections from the car hopper thereto will be later described.

The object being to obtain a record of the net weight of car contents delivered from the loading bin to the dumping chute, together with operation of the car at a maximum rate of speed, it is unfortunately impossible to actuate the recording device during the interval between attainment of a loaded condition in the car hopper and departure of the car from loading position due to the considerable inaccuracy resulting from conditions in the bin mouth 3 in this interval, part of the bin contents actually resting upon the hopper contents at this time. According to my invention I time the actuation of the recording device so that the actual record is taken after the car has cleared the loading bin and before it reaches the dumping position. Conveniently, however, I initiate actuation of the recording cycle as the car leaves the loading position, utilizing for the purpose the operation of the automatic switch 6. As shown in Fig. 1 the car motor circuit includes the trolley 7, switch 6 and motor 5. For actuation of the recording means I provide two parallel circuits. One of these circuits includes the coil 12 of a relay switch 13, a resistance 14 being included in this circuit to prevent substantial interference with the main motor circuit. The armature of the relay switch 13 is in connection with a dashpot 15 and carries a contactor 16. The contactor 16 is arranged to close the second of the parallel circuits to which reference has been made, this second circuit including the actuating coil 17 of the recording apparatus and a resistanct 18 inserted and operable as is the resistance 14. Closing of the switch 6 to complete the motor circuit so as to start the loaded car from beneath the bin mouth 3 thus energizes also the coil 12 of the relay switch 13. The dashpot 15 however serves to delay raising of the armature and closing of the recorder circuit by the contactor 16, until the car has entirely cleared the loading bin and the load in the car hopper has attained a condition of stability. Upon attainment of these conditions, however, the contactor 16 completes the recorder actuating circuit, energizing the coil 17 to record the instant weight of the car hopper contents.

As before stated, the weighing and recording mechanism may be of any suitable or desired description, such as in the Wright patent before referred to. So far as the car mechanism is concerned, including the form, arrangement and mounting of its hopper or body and the connection thereof to the weighing and recording mechanism, these features also may be of any suitable description and specifically form no part of the present invention. However, to more clearly and fully describe the invention, Figs. 3 and 4 illustrate one embodiment of the invention with some measure of detail. The car shown in Fig. 3 is provided with a suitable frame 20 mounted on wheels 21 and supporting a hopper or body 22 of the dump type, provided with any suitable form of dumping mechanism, such as the swinging door 23. On the car frame are mounted one or more rollers 10 constituting the means adapted to engage and operate the bin gate, as conventionally illustrated in Fig. 2. The car hopper is movably mounted on the frame so as to constitute in effect a scale pan, which is a common form of weighing car mechanism. Its movable hopper is provided with suitable connections to actuate the weighing and recording mechanism, and in the form shown the movement of the car body is transmitted by link mechanism to one arm of a beam 24, the other arm of which is connected by a link 25 to one arm of a lever 26 connected by link mechanism 27 to actuate the weighing and recording mechanism in the same manner described and illustrated in the aforesaid patent to Wright, in which the rod 9 constitutes the last member of the connecting linkage or mechanism and corresponds to the link 27 herein.

The weighing and recording instruments include a suitable scale mechanism mounted in the casing 28, one face of which may be provided with visible indicating means 29, the weighing or scale mechanism being connected to operate recording means in the casing 30. These two instruments in casings 28 and 30 may be of the same form described in the aforesaid Wright patent and further description thereof is therefore not necessary.

What I claim is:

1. In combination with a dump scale car arranged for movement along a way between loading and dumping positions and provided with means for weighing the load therein and for recording said weight, means for controlling said car movement, means dependent thereon for presetting said recording means for actuation, and means for delaying said actuation during a predetermined time interval.

2. In combination with a dump scale car arranged for movement along a way between loading and dumping positions and provided with means for weighing the load therein and for recording said weight, means for controlling said car movement, means dependent on actuation of said control means to move said car from said loading position, for presetting said recording means for actuation, and means for delaying said actuation during a predetermined time interval.

3. In combination with a dump scale car arranged for movement along a way between loading and dumping positions and provided with means for weighing the load therein and for recording said weight, means for controlling said car movement, means associated with said controlling means for operation dependent on operation of said controlling means for presetting said recording means for actuation, and means for delaying actuation of said recording means during a predetermined time interval sufficient to insure stability of said load.

4. In combination with a dump scale car arranged for movement along a way between a dumping position and a position to be loaded from a bin, said car being arranged to actuate by its movement the bin gate to open and close the same and being provided with load weighing means and means for recording the weight determined, control means for said car whereby the same is caused to move from said bin, means for pre-setting said recording means for actuation, said pre-setting means being associated with said control means for pre-setting operation upon operation of said control means to move said car from said bin, and means for delaying actuation of said recording means until said car has cleared its loading position.

In testimony whereof I hereby affix my signature.

EUGENE W. SCHELLENTRAGER.